UNITED STATES PATENT OFFICE.

FRANK THATCHER, OF EL PASO, TEXAS.

PROCESS FOR MAKING CATTLE FOOD.

1,257,423.  Specification of Letters Patent.  Patented Feb. 26, 1918.

No Drawing.  Application filed April 9, 1917.  Serial No. 160,834.

*To all whom it may concern:*

Be it known that I, FRANK THATCHER, a citizen of the United States, residing at El Paso, in the county of El Paso and State of Texas, have invented certain new and useful Improvements in Processes for Making Cattle Food; and I do declare the following to be a full, clear, and exact description of the invention, such as will enable others skilled in the art to which it appertains to make and use the same.

This invention relates to a process for making a cattle food from sotol (*Dasylirion Wheeleri*) and other species of plants of the *Yucca* family.

The principal object of my invention is to provide a process whereby cattle food may be economically produced from sotol which, when combined with certain other food products, will produce an equivalent to alfalfa and which can be produced at a cost far below that required to provide a feed of the same amount of alfalfa.

Another object of my invention is to provide a process whereby the sotol may be treated to produce a food product which may be used for other purposes and as a cattle food.

A further object of my invention is to provide a process whereby the sotol may be treated to produce as a by-product glucose or invert sugar.

A still further object of my invention is to provide a novel, simple and efficient manner of treating the sotol to accomplish the desired results.

With these and other general objects in view which will appear from the description, my invention resides in the novel process herein described.

In carrying my invention into practice, I preferably use sotol but it is to be understood that any vegetable material of the *Yucca* family or equivalent substantially to the ingredients embodied in the sotol may be used. The sotol is first macerated, shredded or otherwise disintegrated in a suitable machine, after which it is transferred to a steam cooker and substantially twice its weight in water is added thereto. Steam is then supplied to the cooker and injected into the mass at a pressure of about 25 pounds and is maintained at this pressure for a period of about 2½ hours. The steamed mass is then passed from out of the cooker to a suitable press where the resultant syrup produced during the steaming process is expressed therefrom. This syrup is placed in suitable evaporators and evaporated to the desired consistency and forms the base of my food product.

The fibrous residue of the vegetable material is passed to a suitable washing machine where it is thoroughly agitated and washed and is treated by steam jets placed in the washing machine as an additional means of agitation, after which the material is passed to a suitable press and the liquid therein expressed therefrom and retained to be used to charge a succeeding quantity of shredded sotol in place of water so as to retain and save all possible syrup that may have escaped and remained in the fibrous residue after the first pressing to which it has been submitted. The fibrous material is then passed to a suitable picking machine which separates the fiber from the pith which pith is saved and added to the evaporated syrup forming the base of my food product.

This process will produce a food product from sotol which may be used as a substitute for alfalfa, but as the sotol is not as rich in nutritive quantities as an equivalent quantity of alfalfa, it has been found desirable to add to the compound of the evaporated syrup and the pith, an additional food product to bring the nutritive qualities of the combined food up to the desired amount.

I have found it preferable to add alfalfa meal to the combined syrup and pith but any other suitable grain or meal or in fact any other suitable food product may be added as desired. In manufacturing my food compound, I preferably use the following proportions: To 1 ton of the syrup made by the above process I add 2 tons of alfalfa meal and about 200 pounds of the pith from the sotol.

As the sotol contains glucose, I have found that in the process described herein that glucose or invert sugar is readily obtainable from the syrup produced by the process and if desired, the sotol may be treated to produce this invert sugar or glucose instead of the cattle food product. The syrup also may be used by itself as a food product as desired. All of these by-products and variations, however, may be optionally used and I do not limit myself specifically to the production of only the cattle food product from the sotol. Furthermore, I desire it to be understood that the pressure at which the steam is injected into the mass may be varied as desired to suit individual conditions and the period at which the pressure is maintained may be varied as desired, as I have merely stated this specific manner in order to illustrate the preferred steps in the process.

While I have described specifically the sotol, it is very evident that any vegetable material that will produce the same result may be used in its stead and accordingly I do not wish to limit myself to specifically the use of sotol, but I desire that this process be applied to any such vegetable matter as may fall within the scope of the appended claims.

I claim:—

1. The process of converting sotol into a cattle food by macerating a quantity of the same, adding thereto substantially twice its weight in water injecting steam thereinto at a pressure of about twenty-five pounds for two and one-half hours, expressing the syrup therefrom and condensing the same to the consistency desired.

2. The process of converting sotol into a cattle food by macerating a quantity of the same adding thereto substantially twice its weight in water, injecting steam thereinto at a pressure of about twenty-five pounds for two and one-half hours, expressing the syrup therefrom, separating the pith from the fibrous residue, evaporating the syrup to the consistency desired and combining the condensed syrup and pith.

3. The process of obtaining a food product from vegetable matter by macerating a quantity of sotol and adding substantially twice its weight in water thereto, injecting steam thereinto to thoroughly cook the mass at a pressure of about twenty-five pounds and maintaining the pressure for a period of two and one-half hours, expressing therefrom and evaporating to the desired consistency the resultant syrup, thoroughly washing the fibrous residue of the sotol, expressing the remaining liquid therefrom to add to a succeeding quantity of vegetable matter in place of water, separating the pith from the fibrous residue, adding the pith to the evaporated liquid product and adding to the resultant product alfalfa meal.

In testimony whereof I have hereunto set my hand in the presence of two subscribing witnesses.

FRANK THATCHER.

Witnesses:
H. R. GAMBLE,
HARRIS WOLTHALL.

Copies of this patent may be obtained for five cents each, by addressing the "Commissioner of Patents, Washington, D. C."